July 9, 1957  M. HENTER  2,798,977
DYNAMOELECTRIC MACHINE WITH BARE COLLECTOR LEADS
Filed Oct. 19, 1954
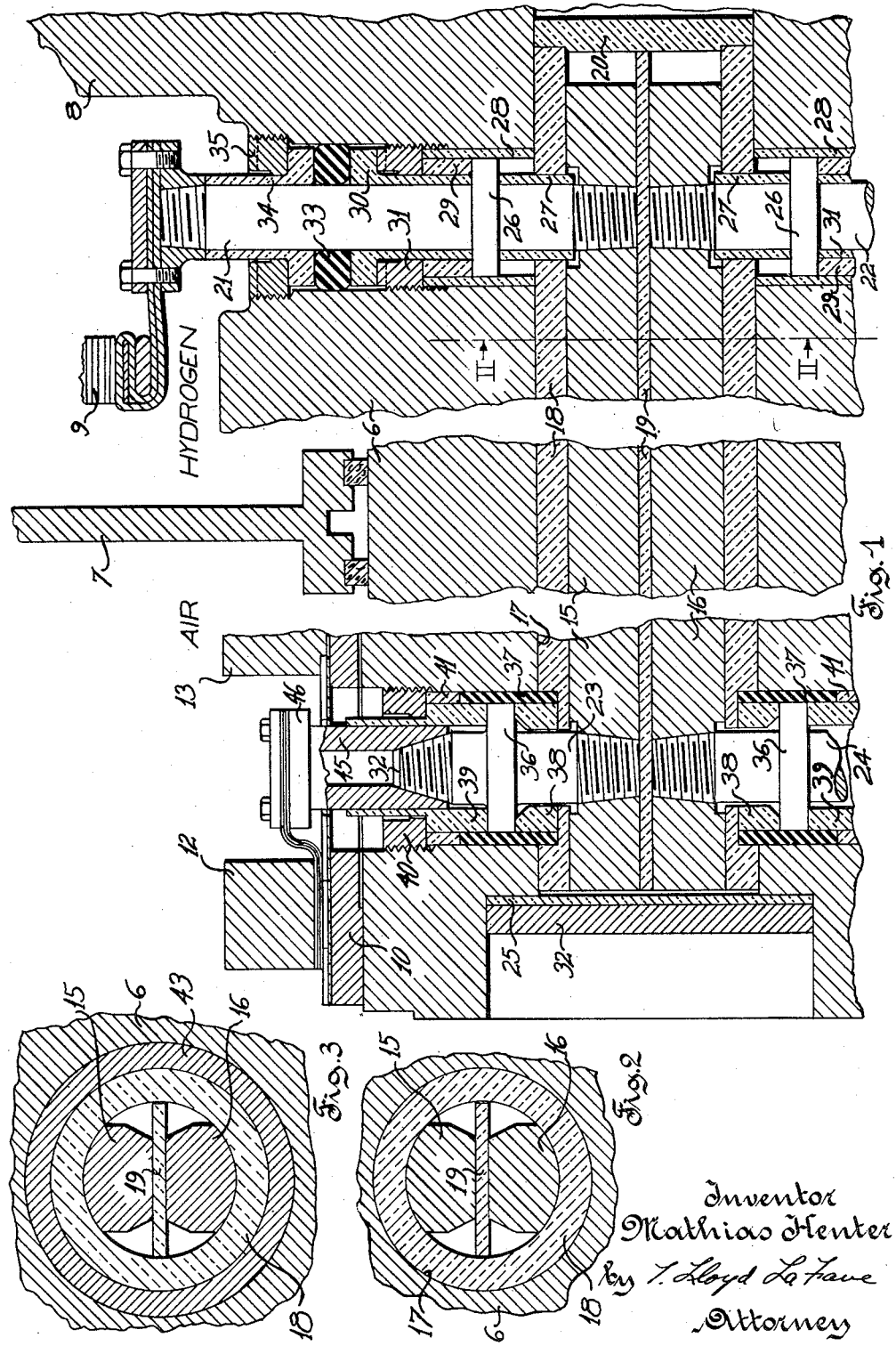
Inventor
Mathias Henter
by T. Lloyd LaFave
Attorney

United States Patent Office 2,798,977
Patented July 9, 1957

2,798,977

DYNAMOELECTRIC MACHINE WITH BARE COLLECTOR LEADS

Mathias Henter, Brookfield, Wis., assignor to Allis-Chalmers Manufacturing Company, Milwaukee, Wis.

Application October 19, 1954, Serial No. 463,264

7 Claims. (Cl. 310—232)

This invention relates to dynamoelectric machines having rotor winding lead conductors disposed in a bore in the rotor shaft for connecting the rotor winding to a current collecting device.

In machines such as turbogenerators the rotor winding lead conductors must be constructed and arranged not to cause rotational unbalance of the shaft, to withstand centrifugal stresses, and to withstand high voltages. For hydrogen cooled machines having current collecting devices outside of the hydrogen containing housing, the lead conductors must be sealed in the shaft to prevent leakage of hydrogen along the lead conductors to the outside of the housing and the leakage of air to the inside.

Heretofore, to suitably secure lead conductors in a bore of the rotor shaft required relatively expensive machining operations and difficult assembly. In hydrogen cooled machines, moreover, failure of the seal required removal of the rotor shaft for repair or replacement of the seal.

The present invention provides a new and improved construction and arrangement of the lead conductors and of the hydrogen seal to provide a relatively inexpensive machining operation and easy assembly of the lead conductors.

It is an object of the present invention to provide an improved arrangement of lead conductors for connecting a rotor winding to a current collecting device.

Another object of the invention is to provide a simplified economical arrangement of lead conductors in an axial bore in the rotor shaft.

Another object of the invention is to provide a hydrogen seal about the lead conductors for the rotor winding with the seal accessible outside of the housing of a hydrogen cooled dynamoelectric machine.

Another object of the invention is to provide a hydrogen cooled turbogenerator having lead conductors including an improved arrangement for insulating and securing in gas tight relation connecting studs extending radially through the shaft.

Other objects of the invention will be apparent from the following description taken with the accompanying drawing, in which:

Fig. 1 is a view in axial cross section of an axially interrupted portion of a dynamoelectric machine embodying the present invention;

Fig. 2 is a cross sectional view taken along the line II—II of Fig. 1; and

Fig. 3 is a cross sectional view of a modification of the lead conductor arrangement of Fig. 1 also embodying the present invention.

In the drawing, the dynamoelectric machine shown is a high speed turbogenerator comprising a rotatable shaft 6 extending through a suitable housing 7 and supported in bearings not shown. Housing 7 is preferably gas tight and is fillable with hydrogen as a ventilating gas. A slotted rotor core 8 is preferably integral with the shaft and contains an axially extending field winding 9 having end turns secured in a known manner by a rotor retaining ring (not shown).

A source of excitation current (not shown) is supplied to the field winding through means including a current collecting device and lead connections. The current collecting device includes slip rings 12, 13 suitably mounted on a sleeve 10 and insulated therefrom with the sleeve 10 removably mounted on the portion of the shaft outside of the housing. The lead connections include lead conductors 15, 16 preassembled and inserted as a unit in an axial bore 17 centrally located in shaft 6. Such preassembled unit includes a tube 18 of insulating material with conductors 15, 16 being bare conductor bars disposed in the tube and separated by a strip of insulation 19. Insulating tube 18 provides the only insulation between conductors 15, 16 and the wall of bore 17, and insulation strip 19 provides the only insulation between conductors 15, 16. Insulation strip 19 extends radially beyond the bare conductor bars 15, 16, and the strip preferably has its sides in abutting engagement with the walls of tube 18 to provide an extended creepage distance along the surface of strip 19 effective against relatively high voltages of the order of 3000 to 5000 volts.

Conductors 15 and 16 have cylindrical surfaces in engagement with the inner periphery of insulating tube 18. While these conductors could approximate half cylinders, they preferably are constructed and arranged in tube 18 with flat sides against insulation strip 19, and with diametrically opposite arcuate surfaces abutting only that portion of the wall of tube 18 remote from insulation strip 19 and remote from its points of abutting engagement with tube 18 to thereby provide an extended creepage distance along the insulation of tube 18 at least as great as the creepage distance along strip 19 to prevent voltage discharge between conductors 15, 16. Opposite ends of tube 18 are closed by disks of insulation 20, 25. Disk 25 at the collector end of the shaft is secured in place by a cover plate 32.

The lead conductors include, besides the axially disposed conductors 15, 16, radially disposed conductors or studs 21, 22 in radial apertures or bores in shaft 6, open to the axial bore 17 adjacent the rotor winding, and studs 23, 24 in radial apertures in the shaft adjacent slip rings 12, 13. Studs 21 to 24 are suitably connected as by threaded engagement to the axially extending conductors 15, 16. The radially outer ends of the studs 21, 22 are connected in a known manner to the rotor winding 9, and the radially outer ends of studs 23, 24 are each connected in threaded engagement with a hollow stud extension 45 of a suitable terminal clamp 46.

Stud 21 has a shoulder or collar 26 preferably integral with the stud. A tube 27 of insulating material closely surrounds the stud between collar 26 and conductor 15. A tube 28 of insulating material surrounds collar 26 and abuts the wall of the aperture. An annular thrust transmitting block 29 is disposed about the stud and seated on the face of collar 26 remote from the axis of the shaft, which is the radially outer face with respect to the axis of the shaft. The wall of the radial aperture has a nut or clamping ring 31 in threaded engagement therewith, and ring 31 when tightened bears against thrust block 29 to rigidly secure stud 21 in shaft 6 against centrifugal forces tending to force the stud radially outward.

A flanged insulating tube 30 is disposed about stud 21 with a cylindrical portion between ring 31 and the stud and with the flange portion overlying the ring. A one piece nonconductive elastic member 33 chemically inactive with oil and hydrogen and not affected by temperatures of the stud is disposed about stud 21 and seated on the flange portion of tube 30. Member 33 is a seal preferably of silicone rubber which is elastic and maintains its elasticity at all operating temperatures without shrinking, cracking or otherwise deteriorating under standstill or operating conditions of the rotor.

Means are provided for securing said one piece elastic member under compression longitudinally of the stud independent of the pressure applied by ring 31 for securing the stud. Such sealing ring securing means includes a flanged insulating tube 34 disposed about stud 21 with the flange abutting the seal member. A nut 35 is disposed about the longitudinal portion of tube 34 and is in threaded engagement with the wall of the aperture. Nut 35 abuts the flange of tube 34 and is tightened to apply a predetermined pressure on seal member 33 causing it to firmly engage both the metal of stud 21 and the wall of the aperture to provide a gas tight seal therebetween. Insulating tubes 27, 28, 30 and 34 and thrust block 29 are preferably made of a molded or laminated thermosetting insulating material containing heat resistant minerals.

Stud 22 is disposed in a radial aperture diametrically opposite stud 21 and is constructed and arranged therein like stud 21.

Studs 23 and 24 at the collector may be constructed and arranged like stud 21 as shown, however, studs 23 and 24 each has a shoulder portion or collar 36 with a tube 37 disposed about collar 36. Tube 37 is a one piece nonconductive elastic member not chemically reactive with oil or hydrogen and is preferably made of silicone rubber serving as a seal member between stud 23 and the wall of the aperture. A ring 38 of insulating material is disposed about stud 23 within sealing tube 37 and under collar 36. A thrust transmitting block 39 is a flanged tube of insulating material disposed about stud 23 with the flange seated on the face of collar 36 remote from the axis of the shaft. A steel clamping ring 40 is in threaded engagement with the wall of the radial aperture and seats on the shoulder of the flanged thrust block 39. Clamping ring 40 is tightened to secure stud 23 against centrifugal forces.

Means securing sealing tube 37 in position under axial compression includes clamping ring 40 and a short section of insulating tubing 41 disposed about thrust block 39 under nut 40. The length of tube 41 is chosen so that clamping ring 40 when tightened will bear against tube 41 and force it against sealing tube 37 to confine tube 37 under a compression force less than the force applied against collar 36. Sealing tube 37 is thereby forced in firm engagement with the outer periphery of collar 36 and the wall of the aperture to thus compress tube 37 to provide a gas tight seal between stud 23 and the wall of the aperture.

Stud 23 is tapered to a reduced cross section at its radially outer end 32 to reduce the centrifugal stress on the stud. Clamping ring 40 secures the stud in place against centrifugal forces tending to force the stud out of the aperture, and clamping ring 40 is disposed at the radially outer end of the aperture where it cooperates with insulating tubing to secure the outer end of the stud in alignment in the aperture. Stud 24 is constructed and arranged like stud 23 in a radial aperture diametrically aligned with stud 23.

Studs 23 and 24 for the collector are outside of housing 7 and seals comprising sealing tubes 37 therefore are accessible without opening the housing to atmosphere when seals comprising seal rings 33 are provided for studs 21 and 22 inside of the housing. Seals 37 may be replaced not only without opening housing 7 but also without removal of shaft 6 or rotor retaining ring not shown.

Fig. 3 is a modification of the lead conductor arrangement shown in Figs. 1 and 2 and shows axially disposed conductors 15, 16 assembled in a unit including an insulating tube 18 but disposed in a steel tube 43 for insertion in an axial bore in a rotor shaft 6. The metal tube 43 and insulating tube 18 have aligned radial apertures receiving the radial studs connecting the axial conductors to the slip rings and rotor winding. The metal tube 43 is used for ease in pre-assembling and for reducing the size of an axial bore for receiving a smaller sized insulating tube 18.

Although but one embodiment and modification of the present invention has been shown and described, it will be understood that changes and other modifications may be made therein without departure from the spirit of the invention or the scope of the appended claims.

It is claimed and desired to secure by Letters Patent:

1. A dynamoelectric machine comprising a rotor having a rotatable shaft and a winding, current collecting slip rings mounted on said shaft, said shaft having an axial bore, a tube of insulating material disposed in said bore, lead conductors for connecting said slip rings to said winding disposed longitudinally in said insulating tube which provides the only insulation between said lead conductors and the wall of said bore, a strip of insulation disposed between said lead conductors, said strip having its sides in abutting engagement with the walls of said tube and providing the only insulation separating said lead conductors, each of said lead conductors being smaller than one of the spaces confined between said tube and said strip and having surfaces in engagement with only the portions of the walls of said tube and of said strip remote from the points of said abutting engagement to provide creepage distance along the insulation between said lead conductors effective against relatively high voltages.

2. A dynamoelectric machine comprising a rotor having a rotatable shaft and a winding, current collecting slip rings mounted on said shaft, said shaft having an axial bore, preassembled elements inserted as a unit in said bore, said unit elements including a metal tube in close fitting engagement with the wall of said bore, a tube of insulating material disposed coaxially in said metal tube, lead conductors for connecting said slip rings to said winding disposed longitudinally in said insulating tube which provides the only insulation between said lead conductors and said metal tube and the wall of said bore, a strip of insulation disposed between said lead conductors, said strip having its sides in abutting engagement with the walls of said tube and providing the only insulation separating said lead conductors, each of said lead conductors being smaller than one of the spaces confined between said tube and said strip and having surfaces in engagement with only the portions of the walls of said tube and of said strip remote from said points of abutting engagement to provide creepage distance along the insulation between said lead conductors effective to prevent voltage discharge between the conductors.

3. A dynamoelectric machine comprising a hydrogen filled housing, a rotor having a winding disposed in said housing and having a shaft extending through said housing, current collecting slip rings mounted on said shaft outside of said housing, said shaft having an axial bore and radial apertures opening in said bore and extending adjacent said winding, a tube of electrical insulating material inserted in said bore, leads for connecting said slip rings to said winding, said leads including axially extending bare conductors disposed in said tube, said insulating tube providing the only insulation between said axially extending conductors and the wall of said bore, a strip of insulation disposed between said axially extending conductors providing the only insulation therebetween, each of said leads including besides one of said axially extending conductors a first radial conductor extending through one of said radial apertures for connection to said winding, a one piece elastic nonconductive annular member chemically inactive with oil and hydrogen disposed about each said radial conductor, and means securing each said one piece elastic member under compression in the axial direction of each said radial conductor to cause each said elastic member to engage both the surface of each said radial conductor and the wall of each said radial aperture to thus provide a gas tight seal in each of said radial apertures.

4. A dynamoelectric machine comprising a hydrogen filled housing, a rotor having a winding, said rotor disposed in said housing and having a shaft extending through said housing, current collecting slip rings mounted on said shaft outside of said housing, said shaft having an axial bore, first radial apertures opening in said bore and extending adjacent said winding, second radial apertures opening in said bore and extending adjacent said slip rings, a tube of insulating material inserted in said bore, leads for connecting said slip rings to said winding, said leads including axially extendng bare conductors disposed in said tube, said insulating tube providing the only insulation between said bare conductors and the wall of said bore, a strip of insulation disposed between said bare conductors providing the only insulation therebetween, each lead including besides one of said bare conductors a first radial conductor extending through one of said first radial apertures for connection to said winding and a second radial conductor extending through one of said second radial apertures for connection to one of said slip rings, one piece nonconductive elastic annular members chemically inactive with oil and hydrogen, one of said one piece elastic members disposed about each of said radial conductors, means securing said one piece elastic members under compression to cause each said elastic member to engage both its associated said radial conductor and the wall of said radial aperture to thus provide a gas tight seal in each of said radial apertures, whereby said seals in said second radial apertures adjacent said slip rings being outside of said machine housing are accessible without opening said housing.

5. A dynamoelectric machine comprising a hydrogen filled housing, a rotor having a winding, said rotor disposed in said housing and having a shaft extending through said housing, current collecting slip rings mounted on said shaft outside of said housing, said shaft having an axial bore and radial apertures opening in said bore, leads for connecting said slip rings to said winding, each said lead including an axially extending conductor disposed in said axial bore and a stud radially disposed in one of said radial apertures with an end of said stud connected to said conductor, said stud having a shoulder, a block of insulation material abutting said shoulder, a clamping ring in threaded engagement with the wall of said aperture abutting said block and tightened to secure said stud against centrifugal force, a one piece non-conductive elastic member chemically inactive with oil and hydrogen disposed about said stud radially outward of said clamping ring, and means securing said one piece elastic member under axial compression independent of the pressure caused by said clamping ring to cause said elastic member to engage both said stud and the wall of said radial aperture to provide a gas tight seal therebetween.

6. A dynamoelectric machine comprising a hydrogen filled housing, a rotor having a winding, said rotor disposed in said housing and having a shaft extending through said housing, current collecting slip rings mounted on said shaft outside of said housing, said shaft having an axial bore, radial apertures opening in said bore leads for connecting said slip rings to said winding, each said lead including an axially extending conductor disposed in said axial bore and a stud radially disposed in one of said radial apertures with an end of said stud connected to said conductor, said stud having a collar integral with said stud, a first tube of insulating and elastic material chemically inactive with oil and hydrogen disposed about said collar, a second tube of insulating material disposed about said stud and within said first tube, one end of said second tube abutting a face of said collar, and a clamping ring in threaded engagement with the wall of said aperture and tightened against both said first tube and the other end of second tube to secure said stud against centrifugal forces and to cause longitudinal compression of said first tube between said collar and the wall of said aperture to provide a gas tight seal therebetween.

7. A dynamoelectric machine comprising a rotor having a winding and a rotatable shaft, current collecting slip rings mounted on said shaft, said shaft having an axial bore, a tube of insulating material disposed in said bore, lead conductors for connecting said slip rings to said winding comprising bare copper bars disposed longitudinally in said tube which provides the only insulation between said bars and the wall of said bore, a strip of insulation disposed between said bars and extending transversely beyond said bars to provide the only insulation between said bars and to provide a creepage distance between said conductors along said strip effective against potentials to 5000 volts, each of said lead conductors having surfaces in engagement with only portions of the wall of said tube to provide creepage distance between said conductors along the wall of said tube at least as great as the creepage distance along said strip.

References Cited in the file of this patent

UNITED STATES PATENTS

| | | |
|---|---|---|
| 1,596,557 | Scholes | Aug. 17, 1926 |
| 2,286,871 | Mortensen | June 16, 1942 |

FOREIGN PATENTS

| | | |
|---|---|---|
| 24,985 | Denmark | Sept. 8, 1919 |
| 408,703 | Great Britain | Apr. 19, 1934 |